United States Patent
Contreras (10) Patent No.: US 11,761,490 B2
(45) Date of Patent: Sep. 19, 2023

(54) DRIVE TRAIN CONNECTOR ASSEMBLY

(71) Applicant: Nissan North America, Inc., Franklin, TN (US)

(72) Inventor: Alberto Contreras, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 155 days.

(21) Appl. No.: 17/187,549

(22) Filed: Feb. 26, 2021

(65) Prior Publication Data

US 2022/0275838 A1 Sep. 1, 2022

(51) Int. Cl.
| | | |
|---|---|---|
| *F16D 3/38* | (2006.01) | |
| *F16B 21/16* | (2006.01) | |
| *F16D 3/34* | (2006.01) | |

(52) U.S. Cl.
CPC ............ *F16D 3/387* (2013.01); *F16B 21/165* (2013.01); *F16B 2200/30* (2018.08); *F16D 3/34* (2013.01)

(58) Field of Classification Search
CPC .... F16B 21/165; F16B 21/18; F16B 2200/30; F16D 2001/102; F16D 2127/06; F16D 2003/22313; F16D 2003/22323; F16D 2003/22326; F16D 1/033; F16D 1/072; F16D 1/076; F16D 1/10; F16D 1/104; F16D 1/108; F16D 1/116; F16D 3/34; F16D 3/387; Y10S 464/901; Y10T 403/49; Y10T 403/58; Y10T 403/581; Y10T 403/583;

(Continued)

(56) References Cited

U.S. PATENT DOCUMENTS 218,723 A * 8/1879 Faust ...................... F16D 1/033
                                                  403/336
959,854 A * 5/1910 Grierson ................. F16L 37/26
                                                  403/381

(Continued)

FOREIGN PATENT DOCUMENTS

| CH | 614503 A * 11/1979 | ............... F16D 1/02 |
| DE | 2222168 A1 * 11/1972 | ............. F16D 1/033 |

(Continued)

OTHER PUBLICATIONS

2021 TB Wood's, Sintered Iron Jaw Coupling Hubs.

*Primary Examiner* — Josh Skroupa
(74) *Attorney, Agent, or Firm* — Global IP Counselors, LLP (57) ABSTRACT

A drive train connector assembly includes a first connecting structure and a second connecting structure. The first connecting structure has an attachment protrusion with first and second edges. The first edge extends in a first direction. The second edge extends in a second direction. Both directions are perpendicular to the rotational axis. The first and second directions define a first acute angle therebetween. The second connecting structure defines recessed area. The attachment protrusion fits into the recessed area. The recessed area defines third and fourth edges. The third edge extends in a third direction and the fourth edge extends in a fourth direction. The third direction and the fourth direction define a second acute angle. With the attachment protrusion installed within the recessed area the first and third edges are parallel to one another and the second and fourth edges are parallel to one another.

19 Claims, 10 Drawing Sheets (58) Field of Classification Search
CPC ............. Y10T 403/592; Y10T 403/604; Y10T 403/7015; Y10T 403/7094
USPC .... 403/274, 315, 316, 317, 322.2, 328, 353, 403/381; 464/98, 149, 182, 901
See application file for complete search history.

(56) References Cited

U.S. PATENT DOCUMENTS

| | | | | |
|---|---|---|---|---|
| 1,715,293 | A * | 5/1929 | Hubbard | F16D 1/033 403/336 |
| 1,791,186 | A * | 2/1931 | Black | E21B 10/44 403/381 |
| 3,096,831 | A * | 7/1963 | Adams | B21J 7/04 403/331 |
| 4,599,056 | A * | 7/1986 | Crase | F16D 3/04 403/381 |
| 5,022,645 | A * | 6/1991 | Green | F16D 3/04 403/381 |
| 5,203,595 | A * | 4/1993 | Borzone | B25B 23/0021 403/331 |
| 5,469,931 | A * | 11/1995 | Kawata | F16D 1/076 403/342 |
| 5,582,489 | A * | 12/1996 | Marzio | F16D 1/108 403/325 |
| 7,090,700 | B2 * | 8/2006 | Curtis | A61F 2/76 403/381 |
| 7,338,532 | B2 * | 3/2008 | Haberman | F16M 11/041 623/38 |
| 9,133,883 | B2 * | 9/2015 | Mori | F16D 1/10 |
| 10,145,420 | B2 * | 12/2018 | Kawahara | F16D 1/072 |
| 10,550,978 | B2 * | 2/2020 | Kawahara | F16D 1/072 |
| 10,975,916 | B2 * | 4/2021 | Okada | F16D 1/101 |
| 11,181,150 | B2 * | 11/2021 | Tomogami | F16D 1/116 |
| 2018/0283458 | A1 * | 10/2018 | Bernard | F16D 1/072 |
| 2019/0389048 | A1 * | 12/2019 | Yen | F16D 1/101 |
| 2020/0232497 | A1 * | 7/2020 | Hsieh | F16B 21/18 |

FOREIGN PATENT DOCUMENTS

| | | | | |
|---|---|---|---|---|
| DE | 102012216298 A1 * | 3/2014 | ............. | F16D 1/033 |
| FR | 857977 A * | 11/1940 | ............. | F16D 1/076 |

* cited by examiner

DRIVE TRAIN CONNECTOR ASSEMBLY

BACKGROUND

Field of the Invention

The present invention generally relates to drive train connector assembly. More specifically, the present invention relates to drive train connector assembly that includes a first connecting structure with a dovetail shaped projection and a second connecting structure with a dovetail shaped recessed area such that the projection slides into the recessed area coupling/connecting a rotary power providing member to a rotary power receiving member.

Background Information

Automotive manufacturing facilities are always looking for new designs and more efficient methods for improving automotive manufacturing process. The traditional structures that attach a drive shaft to an input shaft of, for example, a rear differential require the alignment of the drive shaft with an input shaft of the rear differential. Thereafter, a technician must manually install and torque to predetermined specifications a plurality mechanical fasteners that fix the drive shaft to the input shaft. This process is difficult to perform robotically and typically requires the manual dexterity of a technician and, hence, can be time consuming.

SUMMARY

One object of the present disclosure is to provide an improved structure that simplifies methods for coupling and/or connecting a rotary power providing member to a rotary power receiving member.

Another object of the present disclosure is to provide a rotary power providing member with a dovetail shaped attachment protrusion and a rotary power receiving member with a dovetail shaped recessed area that receives the attachment protrusion thereby simplifying the assembly process of a vehicle.

In view of the state of the known technology, one aspect of the present disclosure is to provide drive train connector assembly with a first connecting structure and a second connecting structure. The first connecting structure is dimensioned and designed for rotation about a rotational axis and has attachment protrusion that defines a first edge and a second edge. The first edge extends in a first direction perpendicular to the rotational axis. The second edge extends in a second direction perpendicular to the rotational axis. The second direction and the first direction further define a first acute angle therebetween. The second connecting structure defines a recessed area dimensioned such that the attachment protrusion is fitted into the recessed area. The recessed area defines a third edge and a fourth edge. The third edge extends in a third direction perpendicular to the rotational axis. The fourth edge extends in a fourth direction. The third direction and the fourth direction define a second acute angle therebetween such that with the attachment protrusion installed within the recessed area the first and third edges are parallel to one another and the second and fourth edges are parallel to one another.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
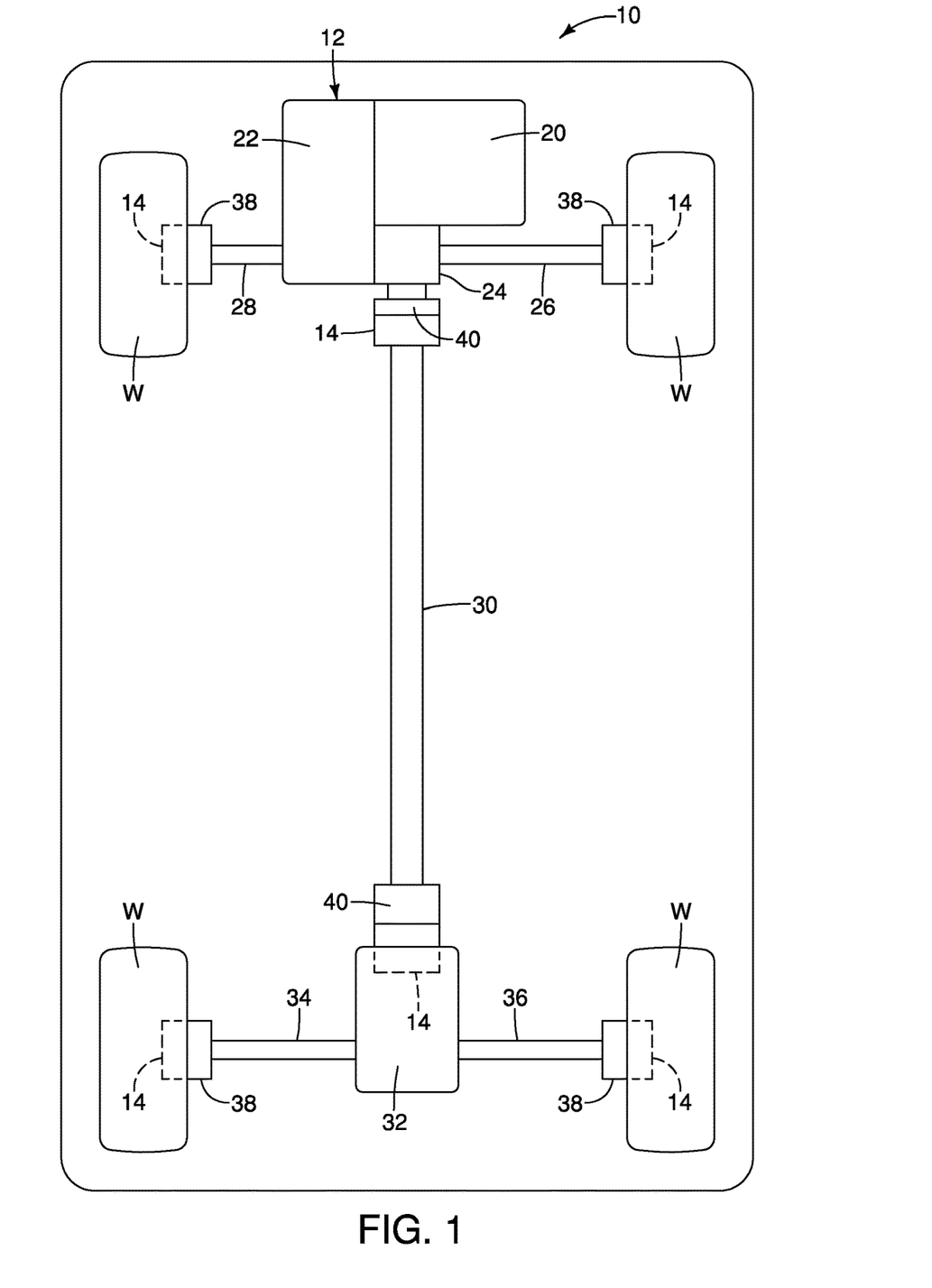
FIG. 1 is a schematic view of a drive train of a vehicle showing various locations where a rotary power providing member (such as a drive shaft) provides rotary power to a rotary power receiving member (such as wheel or a rear differential) via a drive train connector assembly in accordance with a first embodiment.

Referring initially to FIG. 1, a vehicle 10 with a drive train 12 with at least one drive train connector assembly 14 is schematically illustrated in accordance with a first embodiment.

The vehicle 10 can be any of a variety of vehicle models and designs, including a passenger vehicle, a sports utility vehicle (SUV), pick-up truck and/or commercial vehicle, such as a van or a semitruck. The vehicle 10 includes a variety of features, components and structures (not shown) that are conventional features, components and structures. Since these non-depicted features, components and structures of the vehicle 10 are conventional vehicle features, components and structures, further description is omitted for the sake of brevity.

As shown in FIG. 1, the drive train 12 includes, among other things, an engine 20, a transmission 22, a transfer case 24, forward drive shafts 26 and 28, a main drive shaft 30, a rear differential 32, rearward shafts 34 and 36, wheels W and the at least one drive train connector assembly 14.

The engine 20, the transmission 22, the transfer case 24 (for changing drive train operation from two wheel drive operation to four wheel drive operation), the forward drive shafts 26 and 28, the main drive shaft 30, the rear differential 32, the rearward shafts 34 and 36 and the wheels W are all conventional vehicle devices and components. Consequently, description of these various vehicle devices and components will be omitted for the sake of brevity.

The forward drive shafts 26 and 28, the main drive shaft 30 and the rearward shafts 34 and 36 are referred to herein below as rotary power providing members in that with the vehicle 10 in motion, they can be operated to provide rotary power to a corresponding one or ones of the drive shaft connector assemblies 14, as is described in greater detail below. Outboard ends of each of the forward drive shafts 26 and 28 and outboard ends of the rearward shafts 34 and 36 include constant velocity joints 38 (also referred to herein below as CV joints 38). The CV joints 38 are further connected to corresponding one of the drive shaft connector assemblies 14.

The wheels W and the rear differential 32 are also referred to herein below as rotary power receiving members in that they receive rotary power from a corresponding one of the forward drive shafts 26 and 28, the main drive shaft 30 and the rearward shafts 34 and 36, as is described in greater detail below.

In the first embodiment, the drive train 12 is depicted as a four wheel drive train capable of switching between a four-wheel drive mode of operation and a two-wheel drive mode operation. Specifically, the transfer case 24 can include a mechanism operable to switch between the four-wheel drive mode operation and the two-wheel drive mode operation, in a conventional manner. The depicted drive train 12 and the transfer case 24 can also be configured as an all-wheel drive train that always operates in a four-wheel drive mode. As shown in the various alternate embodiments described herein below, the drive train connector assembly 14 can be used in the drive train of a vehicle that is capable of four-wheel drive switchable to two-wheel drive, an all-wheel drive vehicle, a front wheel drive vehicle or a rear wheel drive vehicle.

Since each of four-wheel drive trains, two-wheel drive trains, all-wheel drive trains, front wheel drive trains and rear wheel drive trains are conventional drive trains configurations, further description of the specifics of these drive trains is omitted for the sake of brevity.

A description of the drive train connector assembly 14 is now provided with reference to FIGS. 1-16. The drive train connector assembly 14 can be employed at any of a variety of locations within the drive train 12 depicted in FIG. 1. For example, in the first embodiment depicted in FIGS. 2-13, the drive train connector assembly 14 can be installed between any of the depicted rotary power providing members and a rotary power receiving members. In the first embodiment, for the sake of brevity, description is provided of the vehicle 10 where the rotary power providing member is the main drive shaft 30 and the rotary power receiving member is the rear differential 32, with the drive train connector assembly 14 operably connected therebetween.

As shown in FIGS. 2-4 and 9-14, the main drive shaft 30 (the rotary power providing member) includes a U-joint 40 and a shaft portion 42. The shaft portion 42 includes a base portion 42a and a pair of projections 42b that connect to the U-joint 40.

The main drive shaft 30, the U-joint 40 and the shaft portion 42 rotate together as a single element, with the shaft portion 42 defining a rotational axis $A_1$. The shaft portion 42 rotates about the rotational axis $A_1$ when the vehicle 10 is in motion and transfers torque (rotational power) from the engine 20 to the rear differential 32 via the drive train connector assembly 14. The shaft portion 42 defines a first connecting structure 42 of the drive train connector assembly 14, as described in greater detail below.

Figure 11:
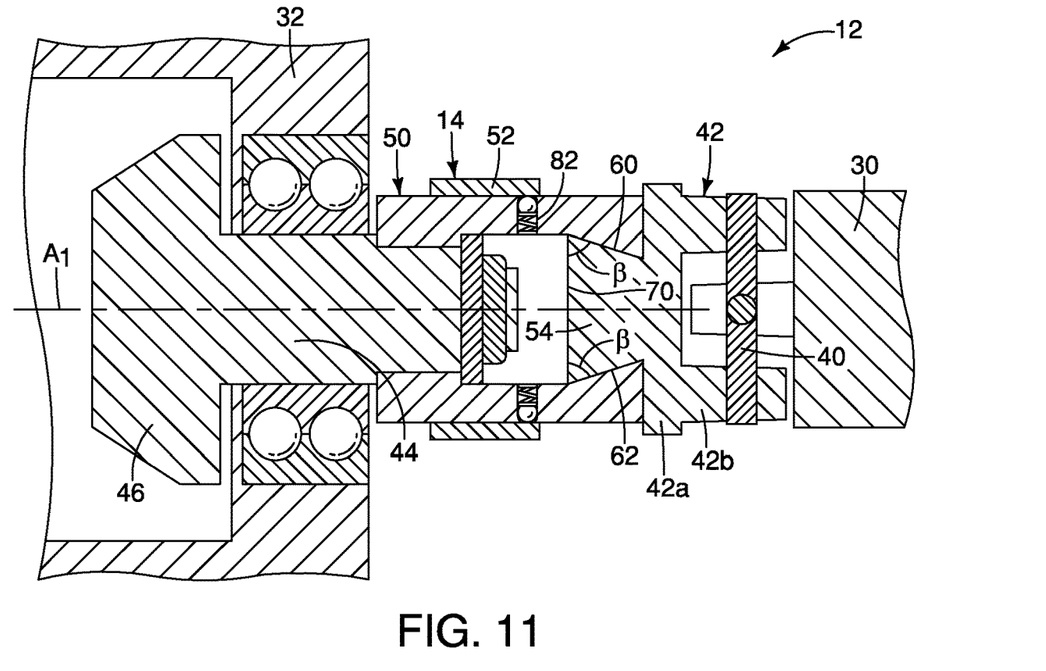
FIG. 11 is a side cross-sectional view of the rearward portion of the drive train and the drive train connector assembly showing the dovetail shaped attachment protrusion of the first connecting structure fully inserted into the dovetail shaped recessed area of the second connecting structure with the sliding cover in the unlocked/release orientation with a spring loaded locking portion being compressed by the sliding cover in accordance with the first embodiment.
Figure 12:
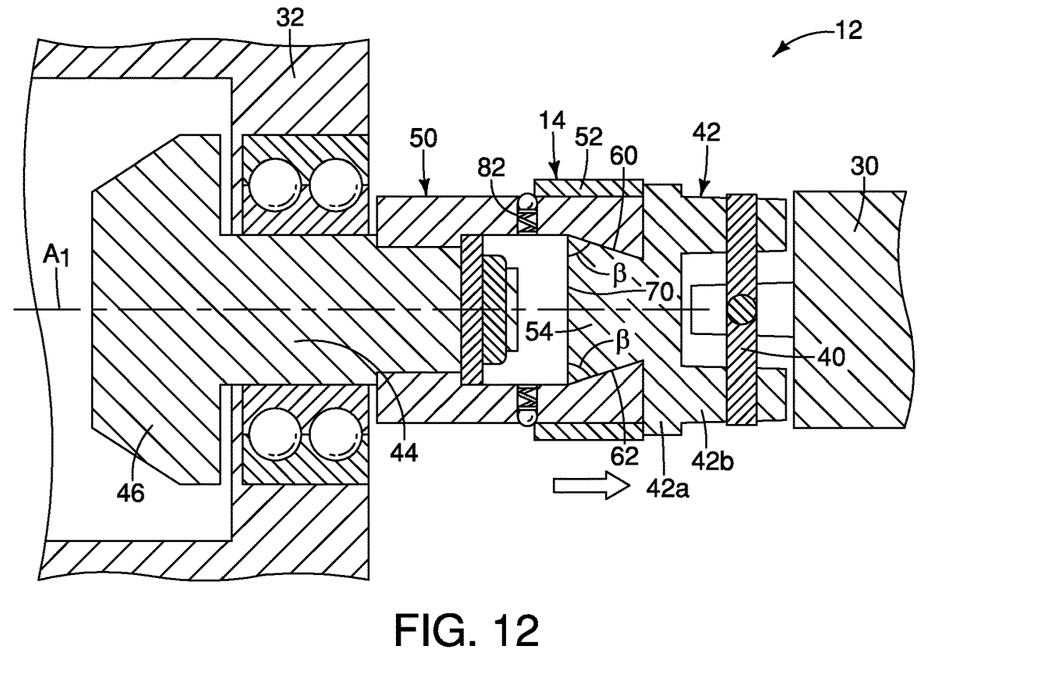
FIG. 12 is another side cross-sectional view of the rearward portion of the drive train and the drive train connector assembly similar to FIG. 11 showing the dovetail shaped attachment protrusion of the first connecting structure fully inserted into the dovetail shaped recessed area of the second connecting structure with the sliding cover moved from the unlocked/release orientation to the locked orientation and further showing the spring loaded locking portion urged radially outward locking the sliding cover in the locked orientation in accordance with the first embodiment.
Figure 13:
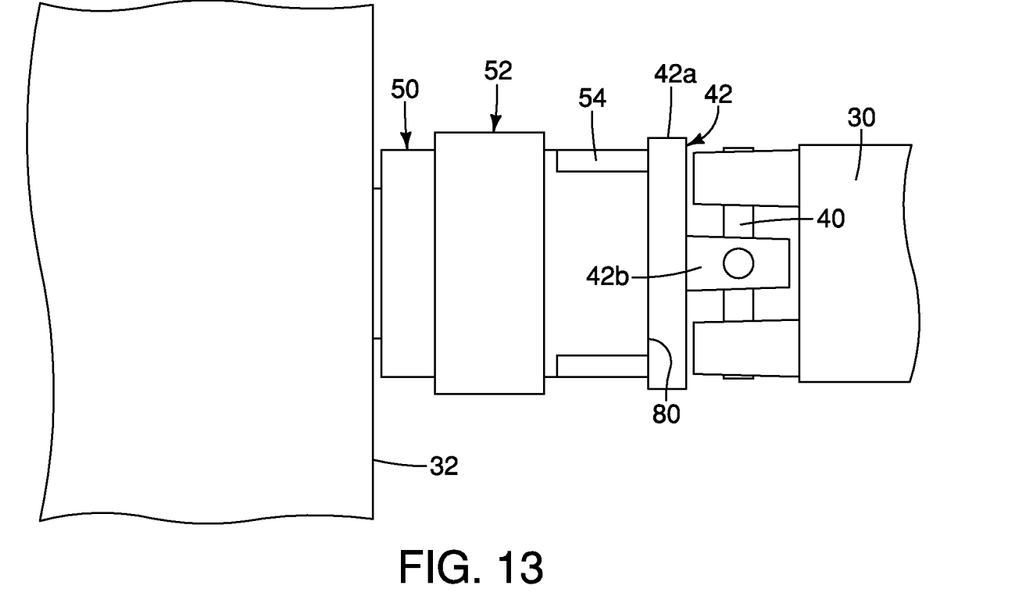
FIG. 13 is another schematic side view of the rearward portion of the drive train and the drive train connector assembly showing the sliding cover in the unlocked/release orientation in accordance with the first embodiment.
Figure 14:
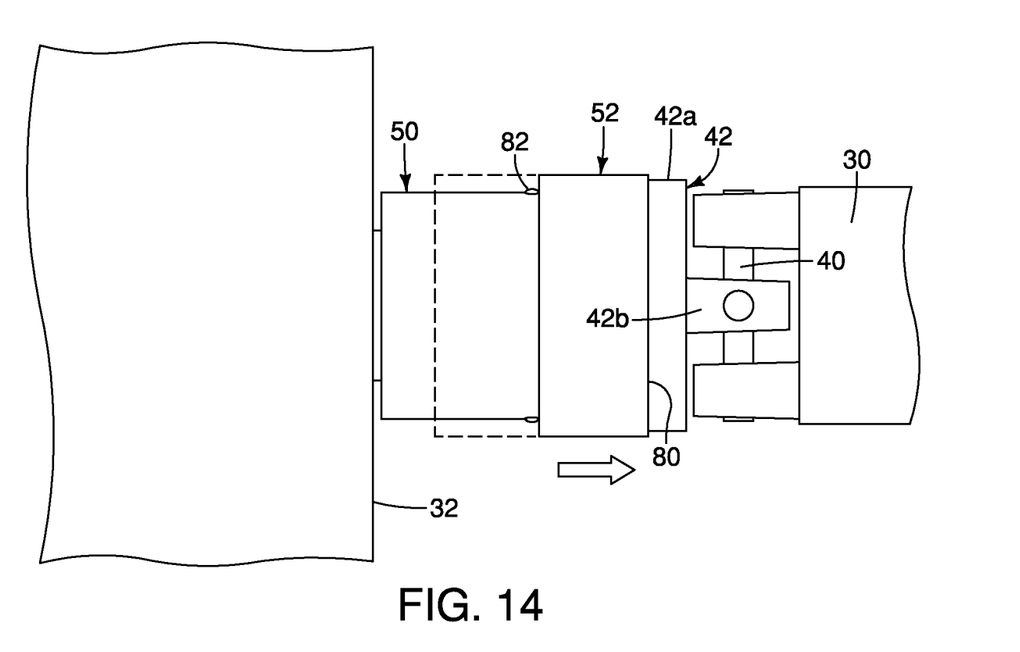
FIG. 14 is still another schematic side view of the rearward portion of the drive train and the drive train connector assembly showing the sliding cover in the locking orientation and retained in the locking orientation by the spring loaded locking portion in accordance with the first embodiment.
Figure 15:
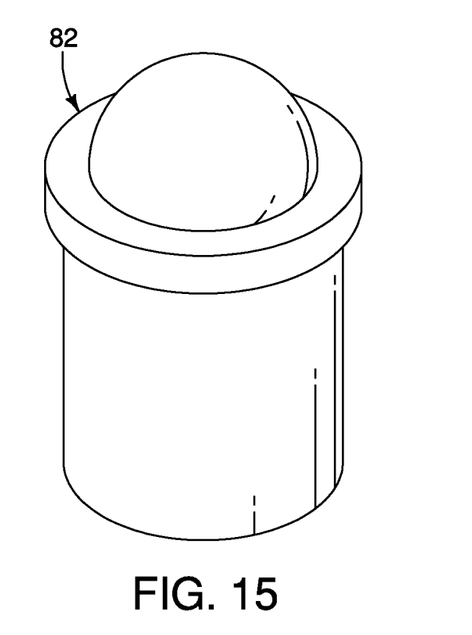
FIG. 15 is a perspective view of the spring loaded locking portion shown removed from the drive train connector assembly in accordance with the first embodiment.
Figure 16:
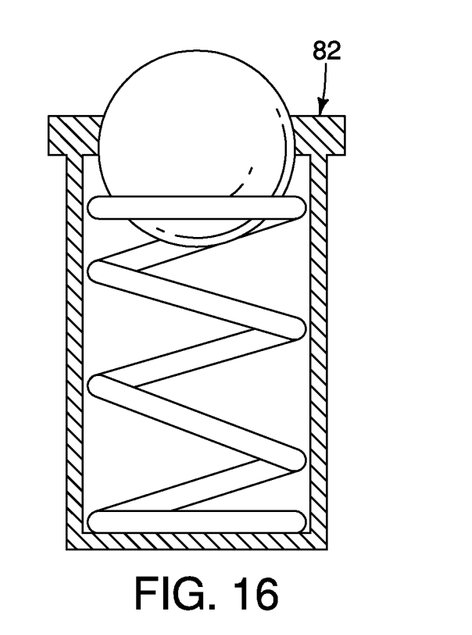
FIG. 16 is a cross-sectional view of the spring loaded locking portion showing a housing, a ball detent and a biasing spring that biases the ball detent to move to a locking position in accordance with the first embodiment.

As shown in FIGS. 11 and 12, the rear differential 32 includes an input shaft 44 connected to a pinon gear 46 within the rear differential 32. Since pinion gears and rear differentials are conventional vehicle drive train assemblies, further description is omitted for the sake of brevity.

As shown in FIGS. 2-3 and 9-14, the drive train connector assembly 14 basically includes the shaft portion 42 (hereinafter referred to as the first connecting structure 42), and a second connecting structure 50 and a sliding cover 52. When assembled to one another, the first connecting structure 42 and the second connecting structure 50 are configured to rotate together about the rotational axis $A_1$. The sliding cover 52 is configured to move between an unlocked orientation (FIGS. 2, 10-11 and 13) and a locked orientation (FIGS. 3, 12 and 14) in which the sliding cover 52 locks the first connecting structure 42 and the second connecting structure 50 in position, engaged with one another, as described further herein below.

Figure 2:
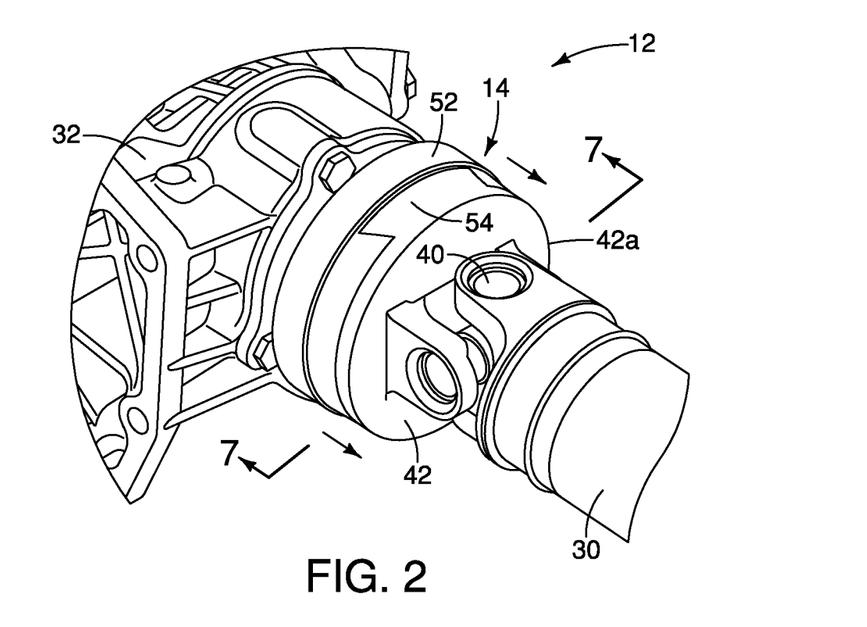
FIG. 2 is a perspective view of a rearward portion of the drive train showing a main shaft (a rotary power providing member), a rear differential (rotary power receiving member) and the drive train connector assembly, the drive train assembly having a first connecting structure that includes a dovetail shaped attachment protrusion and a second connecting structure that includes a dovetail shaped recessed area, with the drive train connector assembly in a partially assembled state with the dovetail shaped attachment protrusion fitted into the dovetail shaped recessed area thereby coupling the main shaft to the rear differential with a sliding cover (a locking cover) of the drive train connector assembly shown in an unlocked/release orientation in accordance with the first embodiment.
Figure 3:
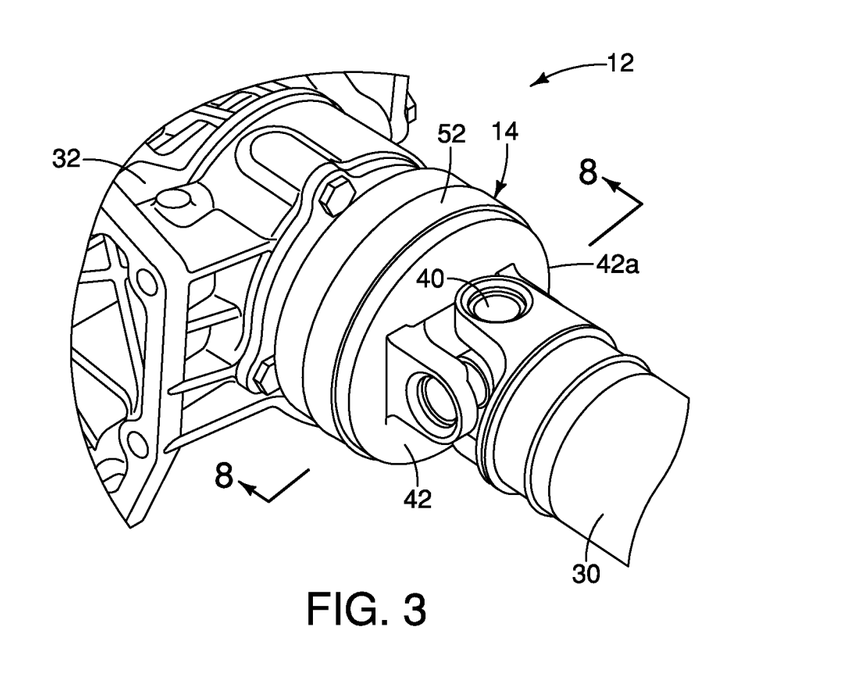
FIG. 3 is another perspective view of the rearward portion of the drive train and the drive train connector assembly similar to FIG. 2, but showing the sliding cover moved from the unlocked/release orientation to a locking or locked orientation covering ends of the dovetail shaped attachment projection thereby preventing movement of the dovetail shaped attachment protrusion out of the dovetail shaped recessed area in accordance with the first embodiment.
Figure 4:
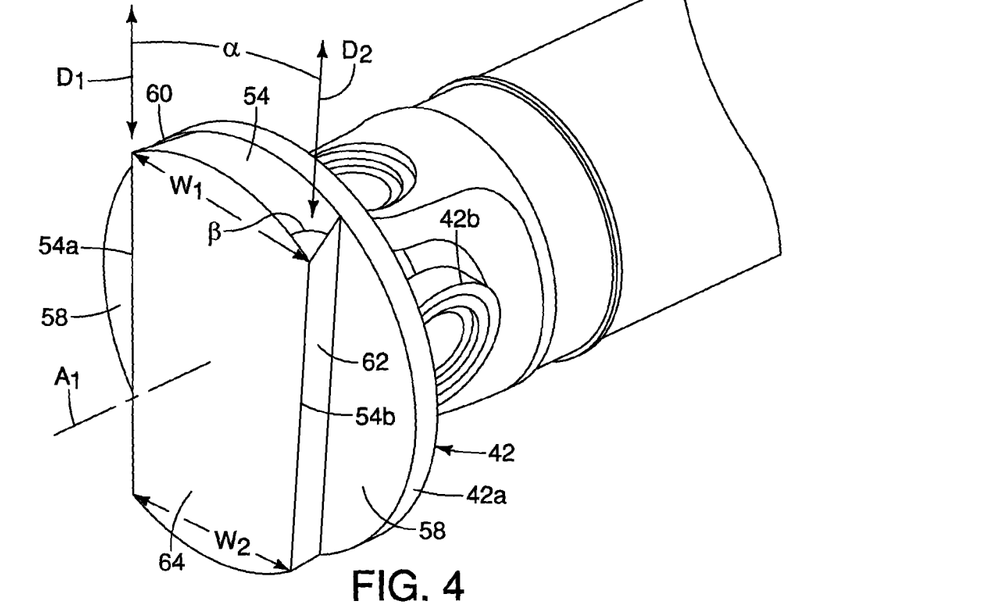
FIG. 4 is a perspective view the first connecting structure showing details of the dovetail shaped attachment protrusion removed from the dovetail shaped recessed area in accordance with the first embodiment.

As shown in FIGS. 2, 3 and 4, the first connecting structure 42 (the shaft portion 42) is connected to the U-joint 40 of the main drive shaft 30 (the rotary power providing member) for rotation therewith. The second connecting structure 50 is configured for connection to and dis-connection from the input shaft 44 of the rear differential 32, as described in greater detail below. When the first and second connecting structures 42 and 50 are connected to one another, the rotated together about the rotational axis $A_1$.

As shown in FIGS. 4, 6-8 and 11-12, the first connecting structure 42 has an attachment protrusion 54 and the second connecting structure 50 has a recess 56 shaped and dimensioned to receive the attachment protrusion 54. The attachment protrusion 54 and the recess 56 have mating dovetail-like shapes that are shaped and dimensioned such that the attachment protrusion 54 slides into the recess 56 in a direction that is perpendicular to the rotational axis $A_1$, as shown in FIGS. 6-12.

Figure 6:
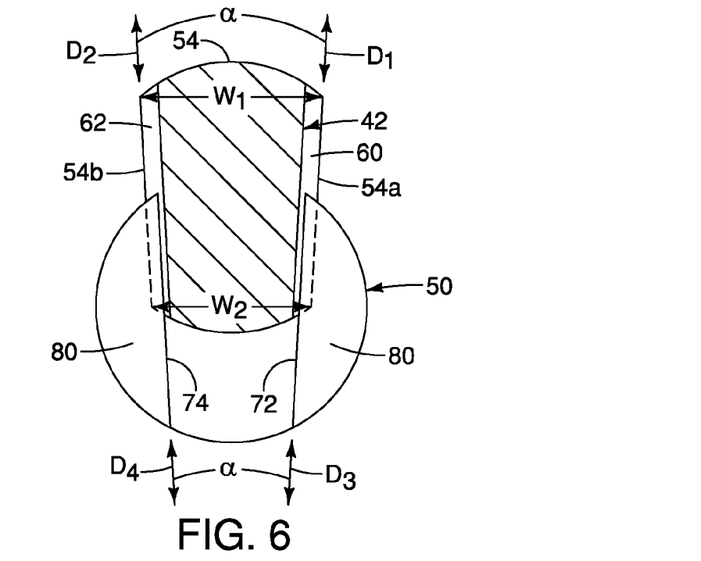
FIG. 6 is a cross-sectional of the drive train connector assembly taken along the line 8-8, but showing the dovetail shaped attachment protrusion of the first connecting structure partially inserted into the dovetail shaped recessed area of the second connecting structure in accordance with the first embodiment.

As shown in FIGS. 4 and 6-8, the attachment protrusion 54 of the first connecting structure 42 defines a first edge 54a and a second edge 54b. As shown in FIGS. 4 and 6, the first edge 54a extends in a first direction $D_1$ that is perpendicular to and non-intersecting with the rotational axis $A_1$. The second edge 54b extends in a second direction $D_2$ that is also perpendicular to and non-intersecting with the rotational axis $A_1$. Further, the second direction $D_2$ and the first direction $D_1$ are not parallel, but rather define a first acute angle α therebetween. The edges 54a and 54b of the attachment protrusion 54 define a wedge shape due to the first acute angle α. The first acute angle α is at least 2 degrees and is determined in part upon the overall size and design of the drive train connector assembly 14. In the depicted embodiment, the first acute angle α is any value between 5 and 10 degrees. At its widest end at one side of the rotational axis $A_1$, the attachment protrusion 54 has a width $W_1$. At an opposite end an opposite side of the rotational axis $A_1$, the attachment protrusion 54 has a width $W_2$, as shown in FIGS. 4 and 6. The width $W_1$ is greater than the width $W_2$ as a result of the first acute angle α.

The base portion 42a of the first connecting structure 42 has an overall round disk shape and includes two flat surface portions 58 located on opposite sides of the attachment protrusion 54. The flat surface portions 58 are perpendicular to the rotational axis $A_1$ and are preferably co-planar.

The attachment protrusion 54 extends from the flat surface portions 58 and is located between the two flat surface portions 58, as shown in FIG. 4. The attachment protrusion 54 includes a first side surface 60, a second side surface 62 and an end surface 64. The first side surface 60 extends between one of the flat surface portions 58 and the first edge 54a. The second side surface 62 extends between the other of the flat surface portions 58 and the second edge 54b. The first side surface 60 and the second side surface 62 are both flat, but are not parallel to each other, but rather extend in a corresponding one of the first and second directions $D_1$ and $D_2$. In other words, along any given plane cut through the attachment protrusion 54 perpendicular to the rotational axis $A_1$, the first and second side surfaces 60 and 62 also define the first acute angle $\alpha$.

The first side surface 60 and the adjacent one of the flat surface portions 58 define a second acute angle $\beta$ therebetween. Similarly, the second side surface 62 and the adjacent one of the flat surface portions 58 also define the second acute angle $\beta$ therebetween. In the depicted embodiment, the second acute angle $\beta$ is any value between 70 and 80 degrees.

The end surface 64 of the attachment protrusion 54 extends between the first edge 54a and the second sedge 54b and has rounded ends corresponding to the overall shape of the base portion 42a of the shaft portion 42. The end surface 64 is parallel to the flat surface portions 58. Further, with the attachment protrusion 54 installed within the recessed area 56 the first and third edges 54a and 72 are parallel to one another and the second and fourth edges 54b and 74 are parallel to one another.

Figure 5:
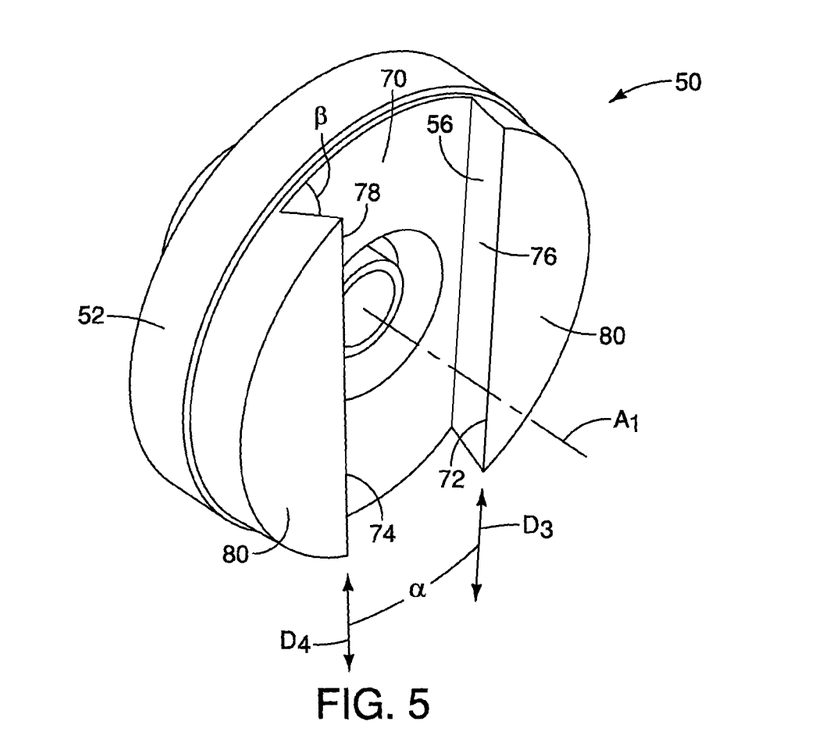
FIG. 5 is a perspective view the second connecting structure showing details of the dovetail shaped recessed area in accordance with the first embodiment.
Figure 7:
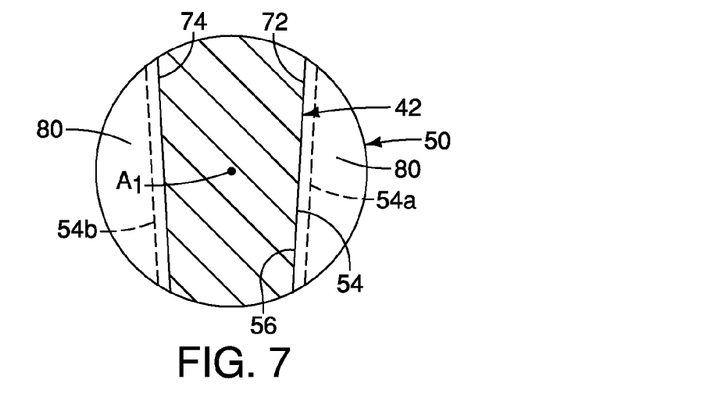
FIG. 7 is another cross-sectional of the drive train connector assembly taken along the line 8-8, showing the dovetail shaped attachment protrusion of the first connecting structure partially fully inserted into the dovetail shaped recessed area of the second connecting structure in accordance with the first embodiment.
Figure 8:
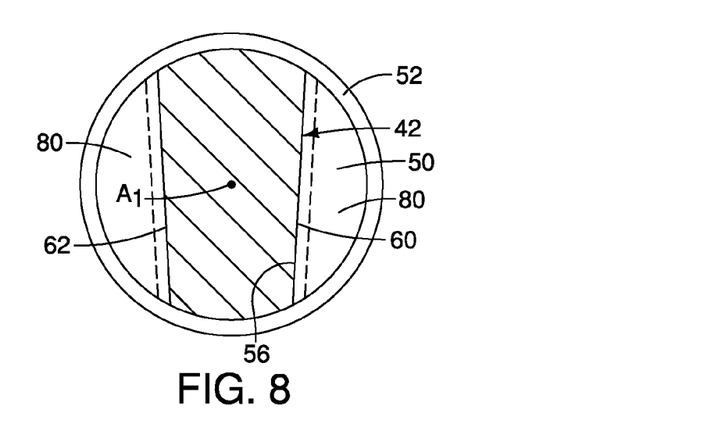
FIG. 8 is yet another cross-sectional of the drive train connector assembly taken along the line 8-8, showing the dovetail shaped attachment protrusion of the first connecting structure partially fully inserted into the dovetail shaped recessed area of the second connecting structure and further showing the sliding cover in the locked orientation preventing movement of the dovetail shaped attachment protrusion relative to the dovetail shaped recessed area in accordance with the first embodiment.

A description of the second connecting structure 50 is now provided with initial reference to FIGS. 5-7. The second connecting structure 50 is configured to rotate about the rotational axis $A_1$ when connected to the first connecting structure 42. The second connecting structure 50 is connected to the input shaft 44 in a conventional manner. As shown in FIG. 5, the recess 56 has an overall dove-tail shape and is dimensioned and shaped such that the attachment projection 54 (having a corresponding dove-tail shaped protrusion) can slide into the recess 56.

Specifically, the recess 56 (also referred to hereinbelow as a recessed area 56) has a bottom surface 70, a third edge 72 and a fourth edge 74, a third side surface 76, a fourth side surface 78 and end surfaces 80. The bottom surface 70 and the end surfaces 80 are perpendicular to the rotational axis $A_1$. The third edge 72 and the fourth edge 74 also define the first acute angle $\alpha$. However, the first acute angle $\alpha$ defined by the third edge 72 and the fourth edge 74 can differ from the first acute angle $\alpha$ of the first edge 54a and the second edge 54b by predetermined tolerances of, for example, plus or minus up to 1 degree.

The third edge 72 extends in a third direction $D_3$ and is perpendicular to the rotational axis $A_1$. The fourth edge 74 extends in a fourth direction $D_4$ and is also perpendicular to the rotational axis $A_1$. The third direction $D_3$ and the fourth direction $D_4$ define the first acute angle $\alpha$ therebetween. The first acute angle $\alpha$ defined between the first and second directions $D_1$ and $D_2$ and the first acute angle $\alpha$ defined between the third and fourth directions $D_3$ and $D_4$ are identical, but can differ by predetermined tolerances of, for example, plus or minus up to 1 degree.

The third side surface 76 and the fourth side surface 78 are both flat, but are not parallel to each other, but rather extend in a corresponding one of the first and second directions $D_1$ and $D_2$. In other words, along any given plane cut through the second connecting structure 50 coinciding with the recessed area 56 and perpendicular to the rotational axis $A_1$, the third and fourth side surfaces 76 and 78 also define the first acute angle $\alpha$.

As shown in FIG. 5, the third side surface 76 and the bottom surface 70 define the second acute angle $\beta$ therebetween. Further, the fourth side surface 78 and the bottom surface 70 also define the second acute angle $\beta$ therebetween. Thus, the attachment protrusion 54 fits into the recess 56 in a dovetail-like manner.

Figure 9:
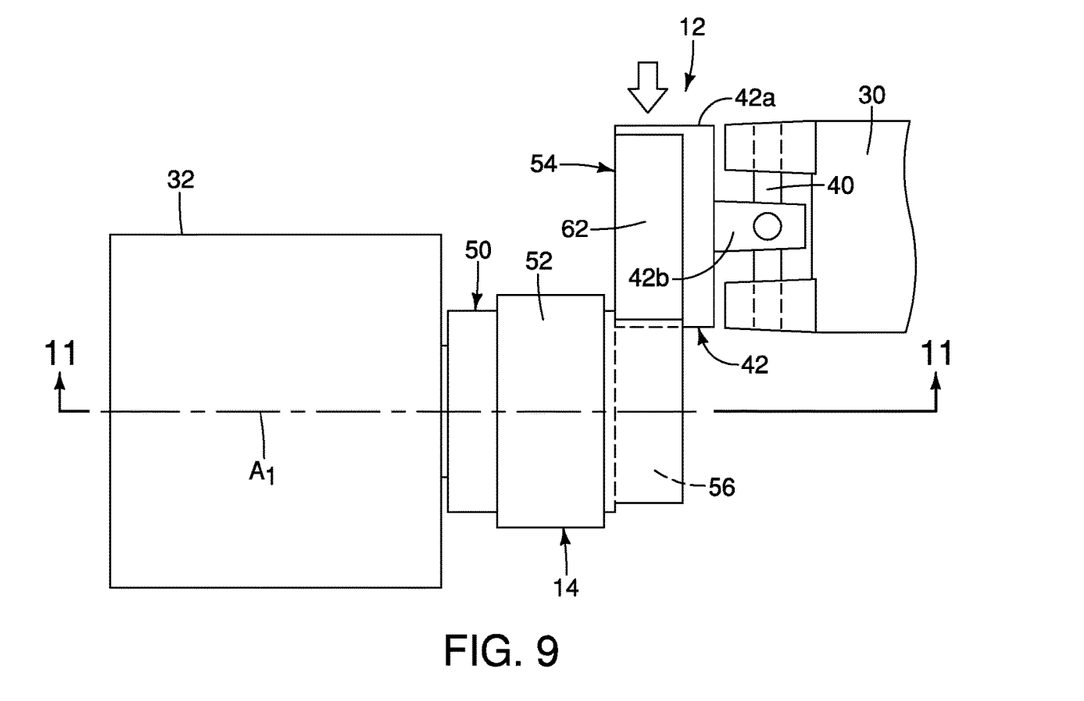
FIG. 9 is a schematic side view of the rearward portion of the drive train and the drive train connector assembly showing the dovetail shaped attachment protrusion of the first connecting structure partially inserted into the dovetail shaped recessed area of the second connecting structure in accordance with the first embodiment.
Figure 10:
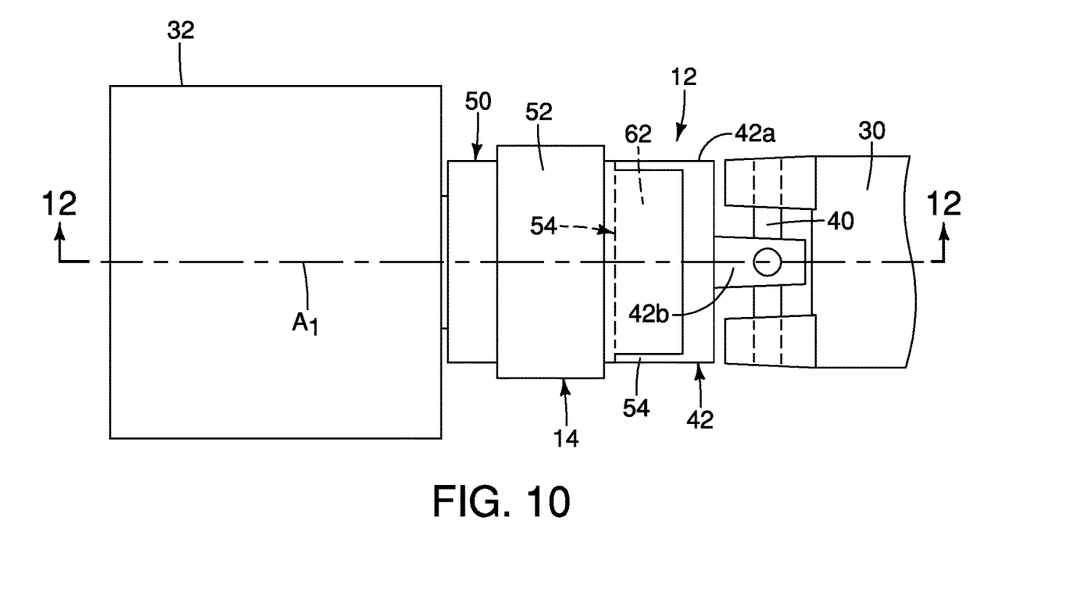
FIG. 10 is another schematic side view of the rearward portion of the drive train and the drive train connector assembly showing the dovetail shaped attachment protrusion of the first connecting structure fully inserted into the dovetail shaped recessed area of the second connecting structure with the sliding cover in the unlocked/release orientation in accordance with the first embodiment.

The angular offset (the first acute angle $\alpha$) between the first edge 54a and the second edge 54b and the third edge 72 and the fourth edge 74 at least partially define the overall dovetail shapes of the attachment protrusion 54 and the recessed area 56. The first acute angle $\alpha$ also is a drag angle such that the overall wedge shape of the attachment protrusion 54 and the recessed area 56 prevents the attachment protrusion 54 from sliding completely through the recessed area 56. Rather, the attachment protrusion 54 and the recessed area 56 dimensioned such that as the attachment protrusion 54 is inserted into the recessed area 56, as shown in FIGS. 6 and 9, the attachment protrusion 54 is captured within the recessed area 56, as shown in FIG. 7. Preferably, when the attachment protrusion 54 is inserted into the recessed area 56 and reaches the location depicted in FIG. 7, the attachment protrusion 54 is basically jammed, confined or trapped in position between third side surface 76 and the fourth side surface 78 due to the drag angle resulting from effects of the first acute angle $\alpha$.

Once the attachment protrusion 54 is installed within the recessed area 56, the end surface 64 of the attachment protrusion 54 overlays and contacts the bottom surface 70 of the recessed area 56. As well, the first side surface 60 of the attachment protrusion 54 and the third side surface 76 of the recessed area 56 contact and press against one another. Similarly, the second side surface 62 of the attachment protrusion 54 and the fourth side surface 78 of the recessed area 56 contact and press against one another. Further, the surface portions 58 of the base portion 42a of the shaft portion 42 overlay and can contact the end surfaces 80 of the second connecting structure 50.

A description is now provided of the sliding cover 52 with specific reference to FIGS. 2-3 and 8-16. The sliding cover 52 is an annular ring shaped member that initially encircles the second connecting structure 50 and is slidable (moveable) between the unlocked orientation (FIGS. 2, 10-11 and 13) and the locked orientation (FIGS. 3, 8, 12 and 14). The unlocked orientation is also referred to hereinbelow as install/release orientation. In the unlocked orientation, the sliding cover 52 encircles only a portion of the outer periphery of the second connecting structure 50. After being slid into the locked or locking orientation, the sliding cover 52 covers a portion of the outer periphery of the first connecting structure 42 (aka, the shaft portion 42) and a different portion of the outer periphery of the second connecting structure 50.

In the unlocked orientation, the sliding cover 52 is positioned such that ends of the attachment protrusion 54 are exposed such that the attachment protrusion 54 can be removed or inserted into the recessed area 56. In the locked orientation, the sliding cover 52 covers the attachment protrusion 54 and adjacent portions of the outer periphery of the second connecting structure 50, thereby preventing movement and removal of the attachment protrusion 54 from the recessed area 56 of the second connecting structure 50. In other words, in the locked orientation, the sliding cover 52 locks the first connecting structure 42 to the second connecting structure 50 and prevents movement between the first connecting structure 42 and the second connecting structure 50.

The second connecting structure 50 is provided with a locking portion 82. In the first embodiment, the locking portion 82 is a spring loaded detent ball device shown in 11-12 and 14-16. The locking portion 82 is inserted into an opening in the second connecting structure 50 and is retained therein. For example, the locking portion 82 can be press-fitted, welded or fixed in place via an adhesive material to the second connecting structure 50. When the sliding cover 52 is in the unlocked orientation (FIGS. 2, 10-11 and 13), the sliding cover 52 compresses and conceals the locking portion 82. Then the sliding cover 52 is slide into the locked orientation (FIGS. 3, 12 and 14), the sliding cover 52 exposes the locking portion 82 such that the ball is urged by the spring radially outward contacting an rearward edge of the sliding cover 52, preventing movement of the sliding cover 52 out of the locked orientation.

It should be understood from the drawings and description herein that the positions of the U-joints 40 and the drive train connector assemblies 14 can be reversed. Specifically, each of the drive train connector assemblies 14 can be directly attached to respective ends of the main drive shaft 30 and the U-joints 40 can be attached to the transmission 22 and the rear differential 32.

Similarly, the positions of the CV joints 38 and the drive train connector assemblies 14 can also be reversed. Specifically, the CV joints 38 can be connected to the wheels W and the drive train connector assemblies 14 can be directly attached to corresponding ends of the forward drive shafts 26 and 28.

The above mentioned reversal of positions of the U-joints 40 and the drive train connector assemblies 14, and the reversal of positions of the CV joints 38 and the drive train connector assemblies 14 also applies to the various embodiments described below.

Second Embodiment

Figure 17:
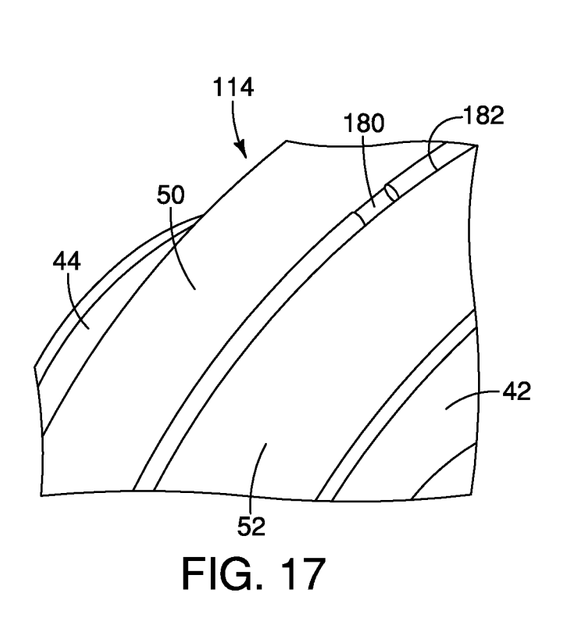
FIG. 17 is a perspective view of a portion of a drive train connector assembly showing the first connecting structure, the second connecting structure and the sliding lid with a locking ring inserted into an annular groove of the second connecting structure locking the sliding lid in the locked orientation in accordance with a second embodiment.
Figure 18:
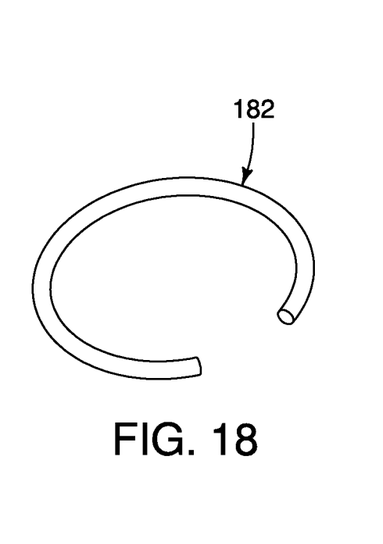
FIG. 18 is a perspective view of the locking ring shown removed from the drive train connector assembly depicted in FIG. 17, in accordance with the second embodiment.

Referring now to FIGS. 17 and 18, a drive train connector assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The drive train connector assembly 114 includes the shaft portion 42 (the first connecting structure 42) and the sliding cover 52, as described above with respect to the first embodiment. However, in the second embodiment, the second connecting structure 50 is modified to include an annular recess 180 that replaces the spring loaded detent ball device serving as part of a locking portion thereof. Further, the drive train connector assembly 114 includes an annular shaped locking ring 182 (FIG. 18) that is installed into the annular recess 180 of the first connecting structure 50, thereby preventing movement of the sliding cover 52 once in the locked orientation depicted in FIG. 17.

Third Embodiment

Figure 19:
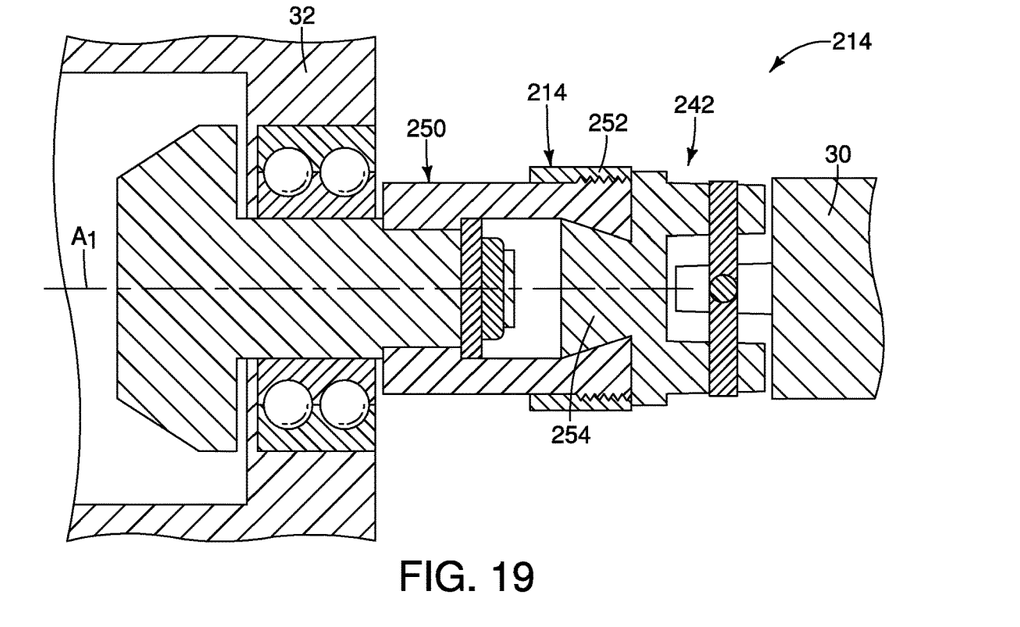
FIG. 19 is a side cross-sectional view of the rearward portion of the drive train and a drive train connector assembly showing the dovetail shaped attachment protrusion of the first connecting structure fully inserted into the dovetail shaped recessed area of the second connecting structure, the second connecting structure being modified to include machine threads along a forward portion of an outer radial surface thereof, with a sliding cover having corresponding machine thread form along a radially inward facing surfaced engaged with the machine threads of the second connecting structure thereby retaining the sliding cover in the locked orientation in accordance with a third embodiment.
Figure 20:
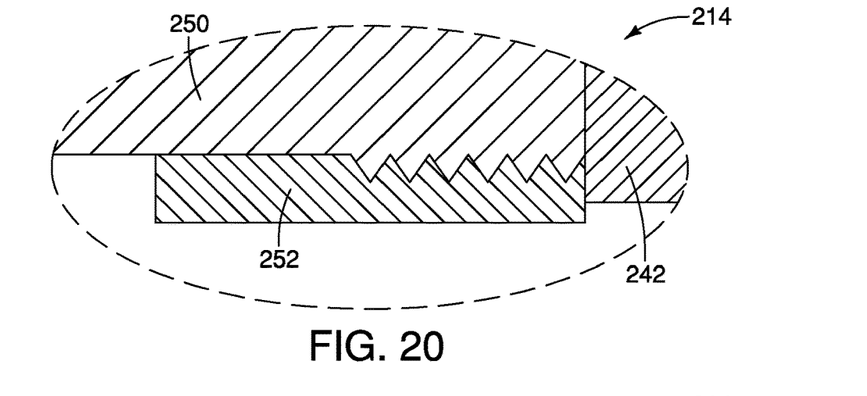
FIG. 20 is an enlarged portion of the side cross-sectional view of the rearward portion of the drive train and the drive train connector assembly depicted in FIG. 19 showing details of the machine threads of the second connecting structure the corresponding machine threads of the sliding cover in the locked orientation in accordance with the third embodiment.

Referring now to FIGS. 19 and 20, a drive train connector assembly 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The drive train connector assembly 214 includes a first connecting structure 242, a second connecting structure 250 and a sliding cover 252.

The first connecting structure 242 includes an attachment protrusion 254 and is basically identical to the first connecting structure 42 of the first embodiment. The second connecting structure 250 is identical to the second connecting structure 50 of the first embodiment, except that the outer cylindrical surface of the second connecting structure 250 includes machined threads in an area adjacent to the first connecting structure 242. The sliding cover 252 is basically the same as the sliding cover 52 of the first embodiment, except that an inner surface of the sliding cover 252 is provided with machined threads that are dimensioned and shaped to threadably engage the machined threads of the second connecting structure 252. The machined threads of the second connecting structure 250 and the sliding cover 252 define the locking portion of the drive train connector assembly 214, replacing the locking portion 82 of the first embodiment.

The sliding cover 252 is shown in the locked orientation in FIGS. 19 and 20, covering the ends of the attachment protrusion 254 preventing separation of the first connecting structure 242 from the second connecting structure 250. When the sliding cover 252 is moved toward the locked orientation, the sliding cover 252 is rotated such that the two sets machined threads engage one another. The sliding cover 252 is eventually rotated and threadedly retained in the locked orientation, as shown in FIGS. 19 and 20. To ensure that the sliding cover 242 remains in the locked orientation, the sliding cover 252 can include wrench engaging openings (not shown) or flat surfaces such that a wrench can engage the sliding cover 252 in order to apply a predetermined amount of torque to the sliding cover 252, ensuring that it remains in the locked orientation.

Fourth Embodiment

Figure 21:
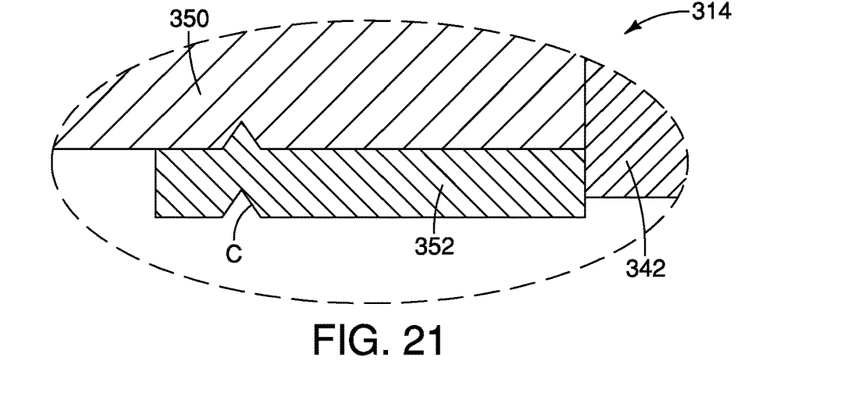
FIG. 21 is a side cross-sectional view of the rearward portion of the drive train and a drive train connector assembly showing the dovetail shaped attachment protrusion of the first connecting structure fully inserted into the dovetail shaped recessed area of the second connecting structure, and a sliding cover having a deformed or crimped area that extends into an annular recess of the second connecting structure thereby retaining the sliding cover in the locked orientation in accordance with a fourth embodiment.

Referring now to FIG. 21, a drive train connector assembly 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The drive train connector assembly 314 includes a first connecting structure 342, a second connecting structure 350 and a sliding cover 352.

The first connecting structure 342 is basically identical to the first connecting structure 42 of the first embodiment and includes all features thereof. The second connecting structure 350 is identical to the second connecting structure 50 of the first embodiment, except that the outer cylindrical surface of the second connecting structure 350 includes a notch or depression, a series of depressions, or a recessed area that extends around an outer periphery thereof. The sliding cover 352 is basically the same as the sliding cover 52 of the first embodiment, except that an outer surface of the sliding cover 252 is intentionally deformed such that the resulting deformed area or crimp C protrudes radially inward and into the notch or depression of the second connecting structure 350. The crimp C replaces the locking portion 82 of the first embodiment.

Fifth Embodiment

Figure 22:
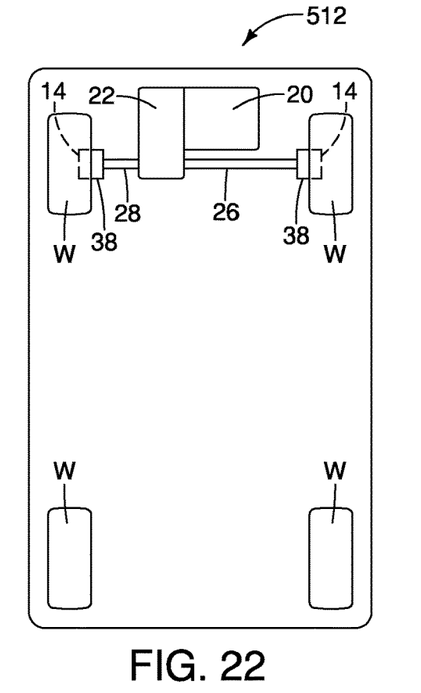
FIG. 22 is schematic view of a drive train of a vehicle configured for front wheel driving with a pair of drive train connector assemblies installed between respective forward drive shafts and forward wheels of the vehicle in accordance with a fifth embodiment.

Referring now to FIG. 22, a drive train 512 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the drive train 512 is configured for front wheel drive only. The drive train 512 includes front wheels W, the engine 20, the transmission 22, forward drive shafts 26 and 28, and the CV joints 38, as referred to in the first embodiment. Further, a pair of drive shaft connector assemblies 14 are installed between the CV joints 38 and the wheels W. Hence, in the fifth embodiment, the rotary power providing member is the automotive transmission 22 (and a corresponding one of the forward drive shafts 26 and 28), and the rotary power receiving member is a corresponding one of the CV joints 38 (constant velocity joint 38) and subsequently the corresponding wheel W.

Sixth Embodiment

Figure 23:
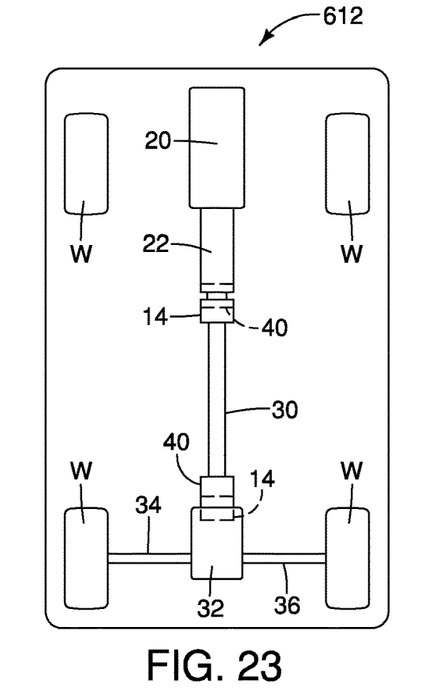
FIG. 23 is schematic view of a drive train of a vehicle configured for rear wheel driving with a pair of drive train connector assemblies installed between forward end of a main drive shaft and a transmission thereof and a rearward end of the main drive shaft and a rear differential in accordance with a sixth embodiment.

Referring now to FIG. 23, a drive train 612 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the drive train 612 is configured for rear wheel drive only. The drive train 612 includes rear wheels W, the engine 20, the transmission 22, rearward drive shafts 34 and 36, and the differential 32, as referred to in the first embodiment. Further, a pair of drive shaft connector assemblies 14 are installed in the drive train 612. Specifically, a first of the pair of drive shaft connector assemblies 14 is installed between the transmission 22 (with a corresponding U-joint) and a forward end of the main drive shaft 30, and a second of the pair of drive shaft connector assemblies 14 is installed between a rearward end of the main drive shaft 30 (and corresponding U-joint) and the differential 32.

Seventh Embodiment

Figure 24:
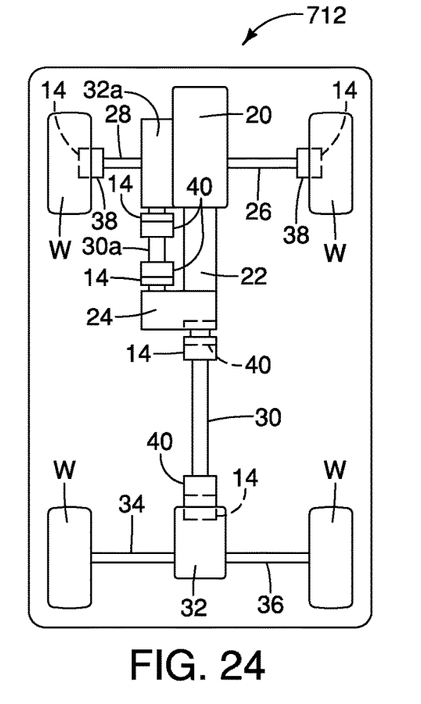
FIG. 24 is schematic view of a drive train of a vehicle configured for all wheel driving with a pair of drive train connector assemblies installed between respective forward drive shafts and forward wheels of the vehicle, and another pair of drive train connector assemblies installed between forward end of a main drive shaft and a transmission thereof and a rearward end of the main drive shaft and a rear differential in accordance with a seventh embodiment.

Referring now to FIG. 24, a drive train 712 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the drive train 712 is configured for all wheel drive only. The drive train 712 includes wheels W, the engine 20, the transmission 22, transfer case 24, forward drive shafts 26 and 28, the main drive shaft 30, rearward drive shafts 34 and 36, a front differential 32a and the differential 32, as referred to in the first embodiment. The drive train 712 further includes a secondary drive shaft 30a and a front differential 32a.

Further, a plurality of drive shaft connector assemblies 14 are installed in the drive train 712. Specifically, the CV joints 38 are connected to respective ones of the wheels W. A pair of drive shaft connector assemblies 14 are installed between respective ones of the CV joints 38 and the forward drive shafts 26 and 28. One of the U-joints 40 is installed to an output shaft (not show) of the transfer case 24. One of drive shaft connector assemblies 14 is installed between the U-joint 40 and a forward end of the main drive shaft 30. Another U-joint 40 is connected to the rearward end of the main drive shaft 30, with another of the plurality of drive shaft connector assemblies 14 installed between the U-joint 40 and the differential 32.

Further, the secondary drive shaft 30a connects the transfer case 24 to the front differential 32. The secondary drive shaft 30a is provided with U-joints 40 at each end thereof. Each of the U-joints 40 is provided with a corresponding one of the drive shaft connector assemblies 14.

Eighth Embodiment

Figure 25:
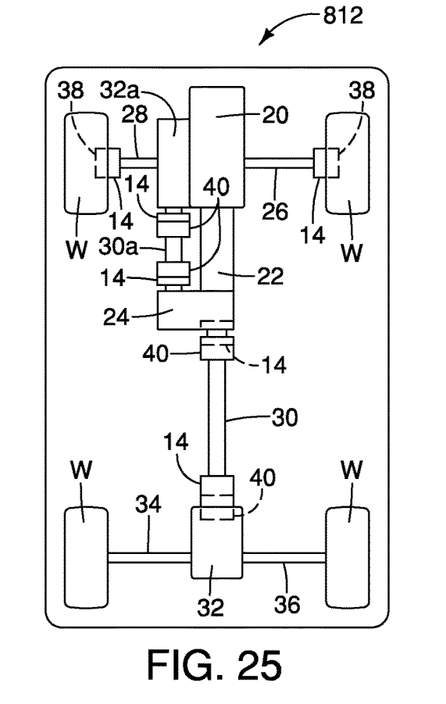
FIG. 25 is schematic view of a drive train of a vehicle configured for all wheel driving with a pair of drive train connector assemblies installed between respective forward drive shafts and forward wheels of the vehicle, and another pair of drive train connector assemblies installed between forward end of a main drive shaft and a transmission thereof and a rearward end of the main drive shaft and a rear differential in accordance with an eighth embodiment.

Referring now to FIG. 25, a drive train 812 in accordance with a seventh embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the drive train 812 can be configured for all wheel drive only. The drive train 812 includes wheels W, the engine 20, the transmission 22, transfer case 24, forward drive shafts 26 and 28, the main drive shaft 30, rearward drive shafts 34 and 36, a front differential 32a and the differential 32, as referred to in the first embodiment. The drive train 812 further includes a secondary drive shaft 30a and a front differential 32a.

A plurality of drive shaft connector assemblies 14 are installed in the drive train 712. Specifically, a pair of the plurality of drive shaft connector assemblies 14 are installed to respective ones of the forward drive shafts 26 and 28 and further attached to respective ones of the CV joints 38. One of the plurality of drive shaft connector assemblies 14 is installed to an output shaft of the transfer case 24, and to a corresponding U-joint 40. The corresponding U-joint is further attached to a forward end of the main drive shaft 30. Another of the plurality of drive shaft connector assemblies 14 is installed to the differential 32 and to a corresponding U-joint 40. The corresponding U-joint 40 is attached to a rearward end of the main drive shaft 30.

The various elements of the vehicle 10 (other than the drive train elements and components described above) are conventional components that are well known in the art. Since such elements are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the drive train connector assembly. Accordingly, these terms, as utilized to describe the present invention should be interpreted relative to a vehicle equipped with the drive train connector assembly.

The term "configured" as used herein to describe a component, section or part of a device includes structure that is constructed and/or designed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A drive train connector assembly, comprising
a first connecting structure dimensioned and designed for rotation about a rotational axis and having attachment protrusion that defines a first edge and a second edge, the first edge extending in a first direction perpendicular to the rotational axis, the second edge extending in a second direction perpendicular to the rotational axis, the second direction and the first direction defining a first acute angle greater than 2 degrees therebetween;
a second connecting structure defining recessed area dimensioned such that the attachment protrusion is fitted into the recessed area, the recessed area defining a third edge and a fourth edge, the third edge extending in a third direction perpendicular to the rotational axis, the fourth edge extending in a fourth direction, the third direction and the fourth direction defining a second acute angle greater than 2 degrees therebetween such that with the attachment protrusion installed within the recessed area the first and third edges are parallel to one another and the second and fourth edges are parallel to one another; and
a cover fitted to and encircling one of the first connecting structure and the second connecting structure, the cover being slid between an install/release orientation and a locking orientation such that in the install/release orientation the second connecting structure is movable relative to the first connecting structure, and in the locking orientation the first connecting structure and the second connecting structure are non-releasably fixed to one another by the cover.

2. The drive train connector assembly according to claim 1, wherein
the attachment protrusion of the first connecting structure and the recessed area of the second connecting structure define mating dovetail-like shapes.

3. The drive train connector assembly according to claim 1, further comprising
a rotary power providing member fixedly attached to the first connecting structure; and
a rotary power receiving member fixedly attached to the second connecting structure.

4. The drive train connector assembly according to claim 3, further comprising
the rotary power providing member is an automotive drive shaft, and
the rotary power receiving member is an automotive differential assembly.

5. The drive train connector assembly according to claim 3, further comprising
the rotary power providing member is an automotive transmission, and
the rotary power receiving member is a constant velocity joint.

6. The drive train connector assembly according to claim 3, further comprising
the rotary power providing member is a constant velocity joint, and
the rotary power receiving member is wheel axle.

7. The drive train connector assembly according to claim 1, wherein
the cover is retained in the locking orientation by a locking portion defined by at least one of the first connecting structure and the second connecting structure.

8. The drive train connector assembly according to claim 7, wherein
the locking portion is a spring loaded detent ball device installed to the second connecting structure.

9. The drive train connector assembly according to claim 7, wherein
the locking portion is a locking ring installed an annular recess of the second connecting structure.

10. The drive train connector assembly according to claim 7, wherein
the locking portion is a crimped area of the cover deformed to engage an annular recess of the second connecting structure.

11. A drive train connector assembly, comprising
a rotary power providing member configured to rotate about a rotational axis;
a rotary power receiving member configured to rotate about the rotational axis;
a first connecting structure configured to rotate about a rotational axis, the first connecting structure being connected to one of the rotary power providing member and the rotary power receiving member and having a dove-tail shaped protrusion, that has a first end at one side of the rotational axis having a first width and a second end on a second side of the rotational axis having a second width with the first width being greater than the second width;

a second connecting structure configured to rotate about the rotational axis when connected to the first connecting structure, the second connecting structure being connected to the other of the rotary power providing member and the rotary power receiving member and having a dove-tail shaped recessed are dimensioned and shaped to receive the dove-tail shaped protrusion; and a cover fitted to and encircling one of the first connecting structure and the second connecting structure, the cover is slid between an install/release orientation and a locking orientation such that in the install/release orientation the second connecting structure is movable relative to the first connecting structure, and in the locking orientation the first connecting structure and the second connecting structure are non-releasably fixed to one another by the cover.

12. The drive train connector assembly according to claim 11, wherein
the dove-tail shaped protrusion and the dove-tail shaped recessed area are shaped and dimensioned with corresponding drag angles, the drag angles being acute angles.

13. The drive train connector assembly according to claim 11, further comprising
the rotary power providing member is an automotive drive shaft, and
the rotary power receiving member is an automotive differential assembly.

14. The drive train connector assembly according to claim 11, further comprising
one of the rotary power providing member and the rotary power receiving member is a constant velocity joint.

15. The drive train connector assembly according to claim 11, wherein
the cover is retained in the locking orientation by a locking portion defined by at least one of the first connecting structure and the second connecting structure.

16. The drive train connector assembly according to claim 11, wherein
the locking portion is a spring loaded detent ball device installed to the first connecting structure.

17. The drive train connector assembly according to claim 11, wherein
the locking portion is a locking ring installed an annular recess of the second connecting structure.

18. The drive train connector assembly according to claim 11, wherein
the locking portion is a crimped area of the cover deformed to engage an annular recess of the second connecting structure.

19. The drive train connector assembly according to claim 11, wherein
the attachment protrusion of the first connecting structure defines a first edge and a second edge, the first edge extending in a first direction perpendicular to the rotational axis, the second edge extending in a second direction perpendicular to the rotational axis, the second direction and the first direction defining a first acute angle greater than 2 degrees therebetween; and
the recessed area of the second connecting structure being dimensioned such that the attachment protrusion is fitted into the recessed area, the recessed area defining a third edge and a fourth edge, the third edge extending in a third direction perpendicular to the rotational axis, the fourth edge extending in a fourth direction, the third direction and the fourth direction defining a second acute angle greater than 2 degrees therebetween.

* * * * *